United States Patent [19]

Lemon

[11] 4,355,587
[45] Oct. 26, 1982

[54] SELF-FEEDING WOOD BURNING HEATING UNIT

[76] Inventor: Wilfred T. Lemon, P.O. Box 1293, Hailey, Id. 83333

[21] Appl. No.: 87,826

[22] Filed: Oct. 25, 1979

[51] Int. Cl.³ ............................................. F23K 3/00
[52] U.S. Cl. ...................................... 110/293; 126/73
[58] Field of Search .................. 126/7, 10, 11, 68, 73, 126/74, 107, 124; 110/293, 101 R, 101 CC, 297; 122/30

[56] References Cited

U.S. PATENT DOCUMENTS

| 2,454,400 | 11/1948 | Norman | 110/293 X |
| 4,201,186 | 5/1980 | Paquin | 126/74 X |

FOREIGN PATENT DOCUMENTS

| 821443 | of 1937 | France | 126/73 |
| 23081 | of 1904 | United Kingdom | 110/293 |

*Primary Examiner*—Edward G. Favors
*Attorney, Agent, or Firm*—Terry M. Crellin; B. Deon Criddle

[57] ABSTRACT

A wood burning heating unit capable of being stoked for continuous or extended burning, and of achieving effective combustion of volatiles contained in the smoke is provided. The stove body, a generally cylindrical casing, is supported so that its axis is substantially horizontal. A baffle divides the casing into a fire box or combustion chamber and an exhaust chamber which functions as a heat exchanger. The exhaust chamber is vented to the outside atmosphere by an exhaust conduit or flue pipe. A pair of elongate, fuel feed conduits extend downwardly and inwardly into the fire box or combustion chamber, so that respective, generally upstanding columns of logs can be formed in the fuel feeding conduits with the lower ends of the wood log columns contacting each other to define and limit the area of combustion in the fire box. Manifold means is provided for drawing combustion air from outside the stove body, passing the air through a heat exchange area in the manifold adjacent to the combustion zone for preheating the combustion air, and then supplying the heated air into proximity of the contact between the two columns of logs.

10 Claims, 6 Drawing Figures

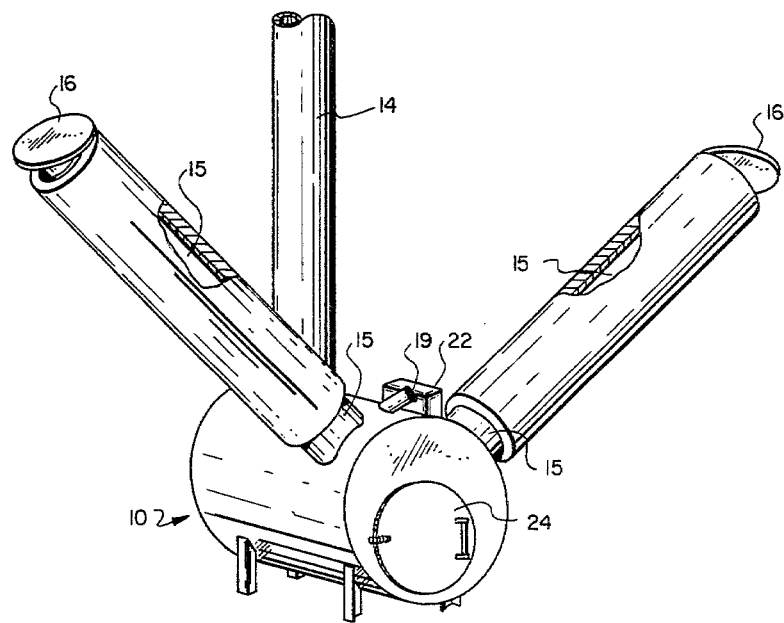
Fig. 1
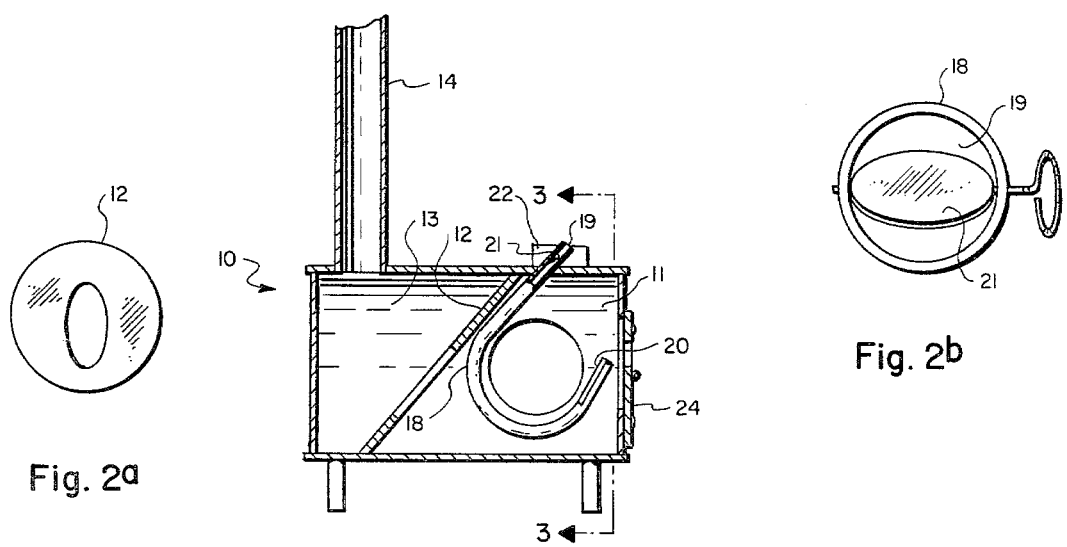
Fig. 2a
Fig. 2
Fig. 2b 4,355,587

SELF-FEEDING WOOD BURNING HEATING UNIT

BACKGROUND OF THE INVENTION

1. Field

The invention pertains to wood burning heating units such as stoves or furnaces and provides such a unit which can be stoked for continuous or at least extended burning times, as well as a unit which achieves more efficient combusting of the fuel, including smoke which is released from the heated wood as the wood burns, a process known as pyrolysis.

2. State of the Art

Stoking of coal fired heating units is well known, but no simple method has, to my knowledge, been proposed for stoking wood burning heating units. Stoves have been proposed wherein a supply of logs is provided in the fire box, and the combustion air is restricted so as to extend the burning time of the logs. Also, secondary air systems have been developed to introduce oxygen to the smoke for combustion of the volatile gases. Thirdly, different air flow patterns have been developed to make the logs burn more steadily and completely. However, such stoves have only limited success in achieving efficient burning of the combustible smoke produced by the smoldering logs because of the lack of sufficient heat.

3. Objectives

A principal objective of the present invention is to provide a wood burning stove having an automatic wood fuel feed system. Another objective is to provide optimal temperature, fuel-air ratio, and mixture through the coordinated use of a wood fuel feed system and combustion air manifold system which provides a small but hot (at least 1100° F., the combustion point of the volatiles contained in wood smoke) combustion zone confined to the log ends in which the gases released from the heated wood are effectively burned, thus greatly increasing the efficiency of the stove. Further objectives are to provide a stove which is convenient and safe to operate and produces less air pollution.

SUMMARY OF THE INVENTION

The above objectives are achieved by providing a wood burning stove comprising a generally cylindrical casting having both ends closed and divided into a fire chamber and an exhaust chamber. A baffle separates the chambers but leaves sufficient opening therebetween to allow exhaust gases and ashes to pass from the fire chamber to the exhaust chamber. The exhaust chamber is vented to the outside atmosphere by an exhaust conduit, flue pipe, or chimney.

A pair of elongate fuel feeding conduits extend downwardly and inwardly into the fire box or combustion chamber, with the conduits forming a "V" shape and having an included angle therebetween of about 45° to about 90°. The lower ends of the conduits are beveled and spaced apart so that a substantially vertically disposed opening is formed between the opposed open ends of the conduits. The upper ends of the conduits are provided with removable or hinged cap members so that wood logs can be introduced longitudinally into the conduits to form respective, generally upstanding columns of logs in the conduits. The lower ends of the wood log columns contact each other in the vertical space between the openings in the lower ends of the conduits. The columns of wood logs continuously move downwardly under the influence of gravity as the lower ends of the column of wood logs are burned in the combustion chamber.

Manifold means is provided for supplying a flow of pre-heated combustion air to the proximity of the contact between the two columns of wood logs, so that combustion of the logs is localized to the area adjacent to the contact between the two columns of logs. The localized combustion results in a small, hot combustion zone wherein voltailes in the smoke produced by the burning wood logs is effectively burned. The purpose of pre-heating the combustion air is so that when it is introduced to the combustion zone, it does not cool the fire and thus hamper complete combustion. Baffle means can further be provided in the fire box for recirculating smoke through the hot combustion zone. The manifold means preferably comprises a substantially "U" shaped pipe having one leg thereof substantially longer than the other. The longer leg extends outwardly from the fire box or combustion chamber and is open so as to be adapted to draw air thereinto. The "U"-shaped bend in the manifold is formed around the lower perimeter of the open space between the pair of fuel feeding conduits. The shorter leg of the manifold extends upward along one side of the open space formed between the fuel feeding conduits, and is provided with a longitudinal slot therein which faces the open space between the pair of fuel feeding conduits. Combustion air is drawn through the open end of the longer leg of the manifold and is preheated as it passes through the manifold adjacent to the combustion zone. The heated combustion air is then drawn through the slot in the shorter leg of the manifold and into proximity of the contact between the two columns of logs in the respective pair of fuel feeding conduits.

Additional objects and features of the present invention will become apparent from the following detailed description of the preferred embodiments taken in conjunction with the accompanying drawings.

THE DRAWINGS

Preferred embodiments of apparatus of the present invention representing the best mode presently contemplated of carrying out the invention is illustrated in the accompanying drawings, in which:

FIG. 1 is a pictorial view of a stove in accordance with the invention;

FIG. 2 is a vertical, central sectional view through the stove of FIG. 1;

FIG. 2a is an elevational view of the baffle plate in the stove of FIG. 2;

FIG. 2b is an axial view of the outer end of the draft conduit of the stove of FIG. 2, showing a manually controlled butterfly valve in place of the thermostatically controlled butterfly valve of FIG. 2.

DETAILED DESCRIPTION OF THE ILLUSTRATED EMBODIMENTS

Figure 3:
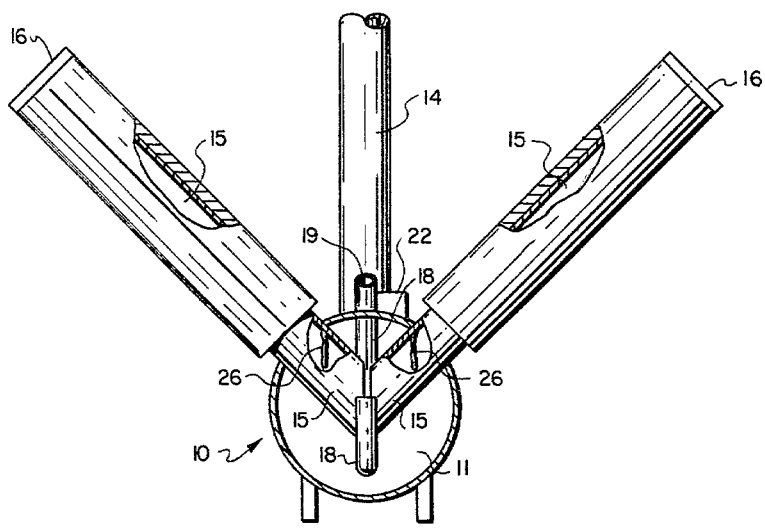
FIG. 3 is a vertical cross sectional view taken on line 3—3 of FIG. 2.

In accordance with the invention, a wood burning stove or heating unit is provided as illustrated in the drawings which is capable of being stoked for continuous or extended burning and of achieving effective combustion of volatiles in the smoke generated by the pyrolysis of the wood.

The stove, shown generally by the reference numeral 10, includes a body enclosing a fire box or combustion chamber 11. As illustrated, the body of stove 10 is shown as being cylindrical, with the cylindrical axis being substantially horizontal. However, it is to be understood that the invention is not restricted to a heating unit having a cylindrical shape. The heating unit can have any conventional shape, such as rectangular, square, etc.

An internal baffle 12 (FIG. 2) divides the interior of the stove 10 into a fire box or combustion chamber 11 and an exhaust chamber 13 which functions as a heat exchanger. The exhaust chamber 13 is vented to the outside atmosphere by an exhaust conduit, flue pipe or chimney 14.

A pair of elongate, fuel feeding conduits 15 extend downwardly and inwardly into the fire box 11. The lower ends of the conduits 15 are beveled so as to form substantially vertically disposed, spaced apart openings which face each other. It has been found advantageous to make the stove body from cylindrical steel having a diameter of about 24 inches and a length of about 42 inches. Such a size allows the fuel feeding conduits 15 to be made of 12 inch diameter steel pipe. Such feeder pipes will conveniently handle all sizes of logs which are commonly used for firewood. In those instances wherein a log has a diameter too large to be received in the feeder conduits 15, the log should be split. The feeder conduits 15 will handle split wood as well as round log sections. The opposed openings at the lower ends of the feeder conduits are preferably spaced from each other by a distance of about 1.5 inches to 3.5 inches, which, as will be more fully explained hereinafter, provides a vertically suspended coal bed or burning area of limited size, wherein sufficiently high temperatures (1100° F. or greater) can be maintained to burn volatiles in the smoke coming from the burning wood.

The upper ends of the fuel feeding conduits 15 are adapted to receive wood logs or split firewood longitudinally therein. The logs or firewood placed in the conduits 15 form upstanding columns of wood sections stacked end-to-end. The conduits slope inwardly into the fire box 11 thereby forming a substantially "V" shape having an included angle of between about 45° and about 90°. The lower ends of the respective columns of wood formed in the conduits 15 contact each other in the space between the openings in the lower ends of the conduits 15. The columns of wood continuously move downwardly in the conduits 15 under the influence of gravity as the lower ends of the columns are burned in the fire box 11. The fuel feeding conduits 15 have means for closing the upper open ends after the wood to be burned has been positioned therein. The closing means preferably comprise end caps 16 which are hingedly attached to the upper ends of the respective conduits 15. The conduits 15 also preferably have a coaxial covering of insulation 17 therearound. The insulation 17 has been found to be effective in minimizing the condensation of creosote and other materials on the inside of the conduits 15, which would otherwise hamper the movement of the columns of wood within the conduits 15. With the insulation 15 as shown, the conduits 15 are maintained at a sufficient temperature to prevent condensation of creosote and other materials thereon.

Manifold means are provided for supplying a flow of combustion air to the proximity of the contact between the two columns of firewood in the conduits 15. The manifold means comprises a conduit having an open end extending outwardly from the fire box or combustion chamber, with the other end having an opening and positioned within the fire box adjacent to the open space between the lower ends of the pair of fuel feeding conduits 15. In the illustrated embodiment, the manifold comprises a substantially "U" shaped pipe or conduit 18 which has an open end 19 extending outwardly from the fire box 11. The "U" shaped bend in the conduit 18 is formed around the lower perimeter of the open space between the ends of the pair of fuel feeding conduits 15. A slot 20 (FIG. 2) is formed in the end portion of the conduit 18 which is positioned in the fire box 11. The slot 20 faces the open space between the ends of the fuel feeding conduits 15. Advantageously, the conduit 18 extends from its open end 19 into the fire box 11 and then around the open space between the ends of the pair of fuel feeding conduits 15, with the other end of the conduit 18 positioned adjacent the open space on the far side of the conduits 15 from the exhaust chamber 13.

Combustion air is drawn through the conduit 18 from its open end 19 which extends from the fire box 11. As the air passes through the portion of the conduit 18 which is formed around the open space between the ends of the pair of fuel feeding conduits 15, the air is heated by the localized fire at the contact between the ends of the columns of firewood. The heated air is then supplied through the slot 20 in the inner end of the conduit 18 to the proximity of the contact between the ends of the two columns of firewood. The localized combustion, fed by a directed stream of heated combustion air, results in a relatively small, hot combustion zone wherein volatiles in the smoke produced by the heated wood is effectively burned. The volatiles in the smoke produced by pyrolysising wood accounts for about one-half of the potential heat energy of the wood fuel. Charcoal accounts for the other half of the heating potential. The charcoal is readily burned in conventional fireplaces, wood stoves, etc., but the smoke containing unburned volatiles is commonly exhausted to the atmosphere through the exhaust vent and any heating potential therefrom is lost. It has been found that by localizing the coal bed or burning area of the fire to a comparatively small area and directing a stream of heated combustion air to the coal bed, temperatures sufficiently high (1100° F. or greater) can be achieved so as to effectively burn the volatiles in the smoke as the volatiles are released from the burning wood. Not only does this result in recovering up to twice the amount of heat from the burning wood, but the amount of atmospheric air pollution resulting from the release of combustion gases thereto is greatly decreased. Rather than release pollutants to the atmosphere, they are burned in the heating unit of this invention.

Control of the volume of air drawn through the manifold is readily achieved by a butterfly type valve 21 positioned in the conduit 18 adjacent to the open end which is located outside the fire box 11. The butterfly valve 21 (FIGS. 2 and 2b) can be either manually operated as shown in FIG. 2b or a thermostat unit 22 as shown in FIG. 2 can be associated therewith for automatic adjustment of the valve. In either situation, when the butterfly valve 21 is closed, the rate of burning of the wood in the fire box 11 is decreased, thereby decreasing the heat output of the heating unit. The thermostat, if used, advantageously operates with respect to the heat radiating surfaces of the heating unit. As the heat output from the fire inside the fire box decreases, for any reason, the temperature of the surface of the heating unit will decrease, and the thermostat 22 will react by opening the butterfly valve 21 to allow more combustion air to enter the fire box 11, thereby increasing the rate of burning of the wood therein. As the surface of the heating unit reaches a preset temperature, the thermostat would partially close the butterfly valve 21, thereby effectively controlling the rate of burn of the wood in the fire box.

An access door 45 (FIG. 4) can be positioned in the side of the heating unit along the exhaust chamber. Such an access is convenient for removal of ashes from the unit. Another access door 24 (FIGS. 1 and 2) can be located in the other end of the unit adjacent the fire box 11 to aid in starting the fire therein as well as access to the fire box 11 for ash removal and maintenance purposes. Door 24 is readily opened to increase the supply of combustion air during the initial start up of a fire in the fire box 11. Once the fire has started, the door 24 is closed.

A flame-proof curtain 26 (FIG. 3) made of a material such as fiberglass or asbestos can be provided adjacent the lower ends of each of the respective fuel feeding conduits 15. The curtains 26 hang downwardly from the upper inside surfaces of the conduits 15, and would drape over the pieces of firewood forming the respective columns of firewood in the conduits 15. The curtains 26 intercept smoke rising from the fire at the lower ends of the columns of firewood and direct the smoke back into the fire in the fire box 11, wherein the combustable material in the smoke is burned. The baffle 12 (FIG. 2) also acts to redirect smoke moving from the fire in the fire box 11 back in a direction toward the fire wherein the combustible materials in the smoke can be burned. In a preferred embodiment, the baffle 12 extends completely across the interior of the stove with an oval opening 12a to provide communication between the fire box 11 and exhaust chamber 11. The baffle 12 is shown in FIG. 2a as it would be seen looking axially from the exhaust chamber 11.

The fire in the heating unit of this invention is strictly confined to the contact between the two columns of firewood in the fire box. These contact surfaces form the coal bed, and, thus, the coal bed assumes a substantially vertical position. The coal bed is self supporting and does not lie on a horizontal grate as in conventional wood burning apparatus. The coal bed is so formed due to the contact of the two columns of firewood and the delivery of combustion air as a vertical stream directed at the contact area between the two columns of firewood.

As the ends of the firewood burn, the columns in the fuel feeding conduits 15 slide downwardly under the influence of gravity. Using 6 inch diameter, dry pine logs, a burn rate of 5 to 6 inches per hour was obtained heating a small house. The heating unit readily burns logs ranging in diameter from about 4 inches to about 11 inches, split or round.

In using the heating unit of this invention, kindling is initially thrown down the fuel feeding conduits 15, followed by a couple of logs in each conduit 15. Kerosene or charcoal lighter can be squirted on the kindling and the kindling is then lighted. The access door 24 is left open for about ten minutes to get a good draft going. The door 24 is then closed, and the butterfly valve 21 is either manually adjusted or set by the thermostat 22 to obtain the desired burn rate. To stoke the stove for continued operation, the caps 16 on the fuel feeding conduits 15 are opened, and logs or split firewood are inserted into the respective conduits 15 until they are filled with columns of firewood. The length of time the heating unit can then go unattended is determined in direct proportion to the length of the fuel feeding conduits. With the recommended basement installation (approximately 12' feeder conduits) about 24 hours is the desired unattended burn time. The heating unit burns long and steady, with little fluctuation in heat output.

The heating unit provides a large heat exchange surface area with no excessively hot spots. As a result of the suspended coal bed, there is no contact between the hot coals and the body of the unit. The fire in the unit is not likely to burn out of control as can happen when excess wood and air are allowed to mix in conventional stoves. With less attention needed by the present heating unit, there is less chance of human forgetfulness and error. The fire in the present unit is restricted to the ends of the two columns of firewood, and the chance of the whole charge of wood catching fire at the same time is essentially eliminated.

Figure 4:
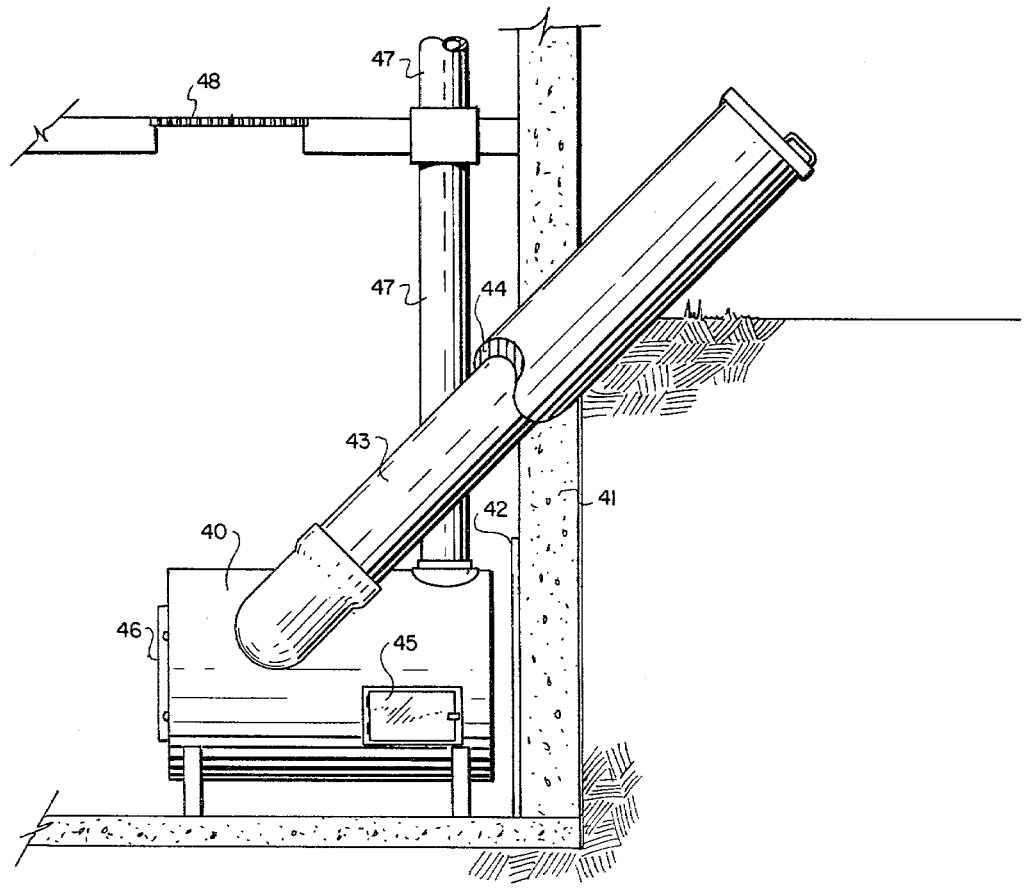
FIG. 4 is a side view of a basement installation of a stove similar to that of FIG. 1.

The heating unit of this invention can be conveniently located in the basement of the house which is to be heated. Such an installation is shown in FIG. 4 of the drawings. The heating unit 40 is supported on the basement floor close to one of the exterior basement walls 41. A heat resistant shield 42 can be placed on the wall 41 adjacent to the heating unit 40 if desired. The fuel feed conduits 43 slope from the heating unit 40 through the exterior basement wall 41 to the outside, where firewood can be inserted thereinto. The firewood can be conveniently stacked near the outside ends of the feed conduits 43. As explained hereinbefore, insulation 44 is advantageously placed around the feed conduits 43 to prevent condensation of creosote and other materials within the conduits 43.

An access opening 45 is conveniently provided in the side of the heating unit 40 near the end thereof housing the exhaust chamber for removal of ashes. A door 46 is also advantageously located in the end of the heating unit adjacent the fire box as described hereinbefore for starting a fire in the unit as well as for cleaning ashes therefrom. The flue pipe 47 extends from the exhaust chamber of the heating unit through the house. As with conventional wood burning stoves, the flue pipe 47 can advantageously be used to radiate heat to the inside of the house. A grating 48 can be located in the floor separating the basement from the ground level floor of the house to expedite movement of heated air from the heating unit 40 to the living areas in the house.

The degree of slant of the fuel conduits toward the basement wall can be as great as about 45° with the gravity descent of the wood therein still being effective at such angles. Preferably, however, it has been found that the angle of the fuel conduits from the perpendicular, whether it be in slanting away from each other as shown in FIG. 3 or in slanting toward an outside wall as in FIG. 4 is about 35°. Such an angle provides adequate run and elevations for basement applications as shown in FIG. 4, and also produces optimum gravitational movement of the wood columns inside the conduits without undue force on the coal bed formed at the contact of the lower ends of the columns.

Although preferred embodiments of the apparatus have been illustrated and described, it is to be understood that the present disclosure is made by way of example and that various other embodiments are possible without departing from the subject matter coming within the scope of the following claims, which subject matter is regarded as the invention.

I claim:

1. A wood burning heating unit capable of being stoked for continuous or extended burning and of achieving effective combustion of smoke, said stove comprising:

a fire box or combustion chamber;

a pair of elongate, fuel feeding conduits extending downwardly and inwardly into the fire box or combustion chamber, with the lower ends of said conduits being beveled so as to have substantially vertically disposed spaced apart openings which face each other, and with the upper ends of said conduits being adjusted to receive elongate pieces of firewood longitudinally therein, so that the respective, generally upstanding columns of firewood are formed in the conduits, with the lower ends of the firewood columns contacting each other in the space between the openings in the lower ends of said conduits, whereby the columns of firewood continuously move downwardly in the conduits as the lower ends of the wood columns are burned;

an exhaust conduit in flow communication with the fire box or combustion chamber for exhausting combustion gases therefrom; and manifold means for supplying a flow of combustion air to the proximity of the contact between the two columns of firewood.

2. A wood burning heating unit in accordance with claim 1, wherein conduits form a "V" with an included angle on the pair of fuel feed conduits being between about 45° and 90°.

3. A wood burning heating unit in accordance with claim 1, wherein the manifold means comprises a conduit having an open end extending outwardly from the fire box or combustion chamber, with the other end thereof having an opening and positioned within the fire box adjacent to the open space between the pair of fuel feeding conduits, whereby combustion air is drawn through the conduit from the open end of said manifold outside said fire box and delivered into proximity of the contact between the two columns of firewood in the fire box.

4. A wood burning heating unit in accordance with claim 1, wherein the manifold means comprises a substantially "U" shaped pipe which has an open end extending outwardly from the fire box or combustion chamber, and the "U" shaped bend in the manifold is formed around the lower perimeter of the open space between the pair of fuel feeding conduits, with a slot in the end portion of the manifold which is positioned in the fire box facing the open space between the pair of fuel feeding conduits whereby combustion air is drawn through the open end of said manifold outside said fire box, the air is heated as it passes through said fire box and around the perimeter of the open space between the pair of fuel feeding conduits, and the heated air is introduced from the slot in said manifold into proximity of the contact between the two columns of firewood in the fire box.

5. A wood burning heating unit in accordance with claim 4, wherein flow control means is provided in the manifold to control the flow of air therethrough.

6. A wood burning heating unit in accordance with claim 5 wherein the flow control means is manually operated.

7. A wood burning heating unit in accordance with claim 5, wherein the flow control means is thermostatically operated.

8. A wood-burning heating unit in accordance with claim 1, wherein a flame-proof curtain is provided adjacent the lower ends of each of the fuel feeding conduits so as to intercept smoke rising in the fuel feeding conduits and direct such smoke back to the combustion zone in the firebox.

9. A wood burning heating unit in accordance with claim 1, wherein high temperature insulation is placed around the fuel feeding conduits which extend upwardly from the firebox or combustion chamber.

10. A wood burning heating unit in accordance with claim 1, wherein a generally cylindrical casing having closed ends is provided, and the casing is divided by baffle means into said firebox or combustion chamber and an exhaust chamber, with said exhaust conduit being connected to the exhaust chamber.

* * * * *